United States Patent
Huang et al.

(10) Patent No.: US 11,429,209 B2
(45) Date of Patent: Aug. 30, 2022

(54) CONTROL KNOB FOR AN APPLIANCE HAVING ROTATIONAL AND AXIAL SELECTION INTERFACE

(71) Applicant: Whirlpool (China) Co., Ltd., Hefei (CN)

(72) Inventors: Yukai Huang, Hefei (CN); Hongqiang Wang, Hefei (CN); Fanmeng Hua, Hefei (CN); Yujin Mao, Hefei (CN)

(73) Assignee: Whirlpool (China) Co., Ltd., Hefei (CN)

( * ) Notice: Subject to any disclaimer, the term of this patent is extended or adjusted under 35 U.S.C. 154(b) by 287 days.

(21) Appl. No.: 16/815,499

(22) Filed: Mar. 11, 2020

(65) Prior Publication Data

US 2021/0005403 A1 Jan. 7, 2021

Related U.S. Application Data

(63) Continuation-in-part of application No. 16/645,660, filed as application No. PCT/CN2019/094608 on Jul. 3, 2019.

(51) Int. Cl.
| | |
|---|---|
| *G06F 3/0362* | (2013.01) |
| *H01H 3/08* | (2006.01) |
| *H01H 19/02* | (2006.01) |
| *G05G 1/10* | (2006.01) |
| *G06F 3/038* | (2013.01) |
| *D06F 34/32* | (2020.01) |
| *D06F 34/30* | (2020.01) |

(52) U.S. Cl.
CPC ............ *G06F 3/0362* (2013.01); *D06F 34/30* (2020.02); *D06F 34/32* (2020.02); *G05G 1/105* (2013.01); *G06F 3/0383* (2013.01); *H01H 3/08* (2013.01); *H01H 19/025* (2013.01)

(58) Field of Classification Search
CPC .... H01H 21/50; H01H 19/005; H01H 25/008; H01H 19/585; H01H 2019/006; H01H 19/14; H01H 1/36; G06F 3/0362; G06F 3/0338; G06F 3/016; G06F 3/0312; G06F 3/03543; G06F 3/03549; D06F 34/28; D06F 25/00; D06F 2101/00; D06F 34/08
See application file for complete search history.

(56) References Cited

U.S. PATENT DOCUMENTS

| | | | |
|---|---|---|---|
| 6,281,453 B1 * | 8/2001 | Uleski | H01H 19/03 200/336 |
| 7,462,795 B2 | 12/2008 | Montalvo | |
| 8,327,671 B2 | 12/2012 | Kim | |

(Continued)

FOREIGN PATENT DOCUMENTS

| | | |
|---|---|---|
| CN | 204189066 | 3/2015 |
| CN | 204434991 | 7/2015 |

(Continued)

*Primary Examiner* — Sanjiv D. Patel
(74) *Attorney, Agent, or Firm* — JCIP Global Inc.

(57) ABSTRACT

A control knob for an appliance includes a base having an axially-operated switch. An outer control assembly is rotationally and axially operable with respect to the base. An inner display assembly is rotationally fixed with respect to the base and axially fixed with respect to the outer control assembly. The inner display assembly is biased toward an extended state and is axially operable to a selection state that engages the axially operated switch.

20 Claims, 12 Drawing Sheets

(56) References Cited

U.S. PATENT DOCUMENTS

| | | |
|---|---|---|
| 9,127,390 B2 | 9/2015 | Kim et al. |
| 9,190,224 B2 | 11/2015 | Polak |
| 10,073,537 B2 | 9/2018 | Lee et al. |
| 10,275,052 B2 | 4/2019 | Kang |
| 2004/0164879 A1* | 8/2004 | Yoritsune ............. H01H 19/005 341/16 |
| 2017/0137991 A1 | 5/2017 | DePellegrin et al. |
| 2017/0177097 A1* | 6/2017 | Ding ........................ G05G 1/08 |
| 2017/0321366 A1 | 11/2017 | Oh et al. |
| 2017/0321367 A1 | 11/2017 | Kim et al. |
| 2019/0003102 A1 | 1/2019 | Lv et al. |
| 2019/0301744 A1* | 10/2019 | Yang .................... H01H 25/065 |

FOREIGN PATENT DOCUMENTS

| | | |
|---|---|---|
| CN | 205943891 | 2/2017 |
| CN | 106968085 | 7/2017 |
| CN | 107134388 | 9/2017 |
| CN | 107675437 | 2/2018 |
| CN | 207541587 | 6/2018 |
| CN | 109881444 | 6/2019 |
| DE | 102017111031 | 11/2018 |
| JP | 2011194115 | 10/2011 |
| KR | 20140005484 | 1/2014 |

* cited by examiner

CONTROL KNOB FOR AN APPLIANCE HAVING ROTATIONAL AND AXIAL SELECTION INTERFACE

CROSS-REFERENCE TO RELATED APPLICATION

The present application is a continuation-in-part of U.S. patent application Ser. No. 16/645,660 filed Mar. 9, 2020, entitled KNOB STRUCTURE FOR WASHING MACHINE AND WASHING MACHINE, which is a national stage entry of PCT/CN2019/094608 filed Jul. 3, 2019, the entire disclosures of which are hereby incorporated herein by reference.

FIELD OF THE DEVICE

The device is in the field of appliances, and more specifically, a control knob for a laundry appliance that includes both axial and rotational interfaces for making a plurality of selections with respect to the appliance.

SUMMARY OF THE DEVICE

According to one aspect of the present disclosure, a control knob for an appliance includes a base having an axially-operated switch. An outer control assembly is rotationally and axially operable with respect to the base. An inner display assembly is rotationally fixed with respect to the base and axially fixed with respect to the outer control assembly. The inner display assembly is biased toward an extended state and is axially operable to a selection state that engages the axially operated switch.

According to another aspect of the present disclosure, a control knob for an appliance includes a base having a switch. An inner display assembly includes a selection protrusion. The inner display assembly is biased away from the switch and toward an extended state and wherein the inner display assembly is selectively and axially operable within the base to a selection state where the selection protrusion engage the switch. An outer control assembly is axially coupled to the inner display assembly and is rotationally operable with respect to the inner display assembly. The outer control assembly and the inner display assembly include an encoder structure. The encoder structure includes at least one contact structure that is rotationally operable with respect to at least one encoder sheet.

According to yet another aspect of the present disclosure, a control knob for an appliance includes a base having an axially-operated switch. An outer control assembly is rotationally and axially operable with respect to the base. An inner display assembly is rotationally fixed with respect to the base and axially fixed with respect to the outer control assembly. The inner display assembly is biased toward an extended state and is axially operable to a selection state that engages the axially operated switch. A detent assembly extends between the base and the outer control assembly. The detent assembly includes a plurality of spring-loaded detents and an opposing detent surface that includes a plurality of axially-elongated channels that engage the plurality of spring-loaded detents in each of the extended and selection states, wherein the detent surface and the spring-loaded detents are rotationally operable and axially operable with respect to one another.

These and other features, advantages, and objects of the present disclosure will be further understood and appreciated by those skilled in the art by reference to the following specification, claims, and appended drawings.

Figure 1:
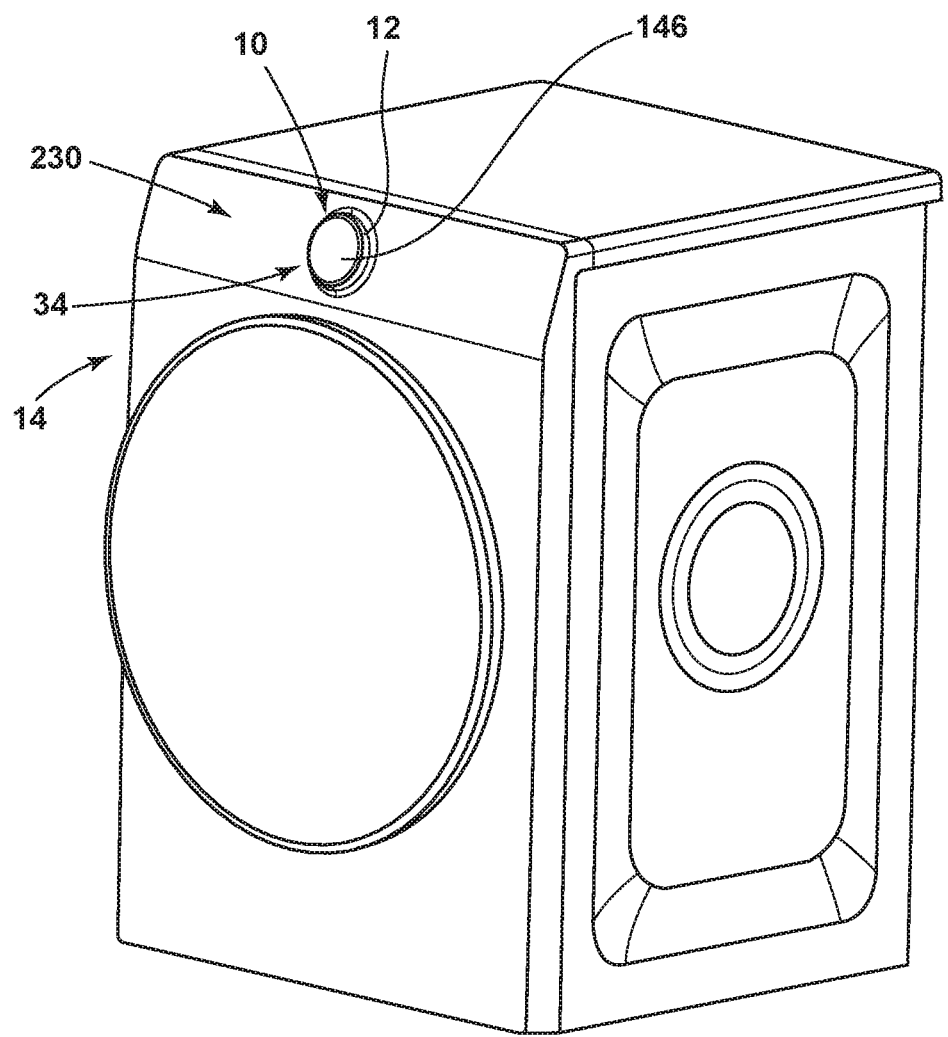
FIG. 1 is a front perspective view of an appliance that incorporates an aspect of the multi-directional control knob.

The components in the figures are not necessarily to scale, emphasis instead being placed upon illustrating the principles described herein.

DETAILED DESCRIPTION

The present illustrated embodiments reside primarily in combinations of method steps and apparatus components related to a control knob for an appliance having rotational and axial interface portions. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . ." does not, without more constraints, preclude the existence of additional identical elements in the process, method, article, or apparatus that comprises the element.

With respect to FIGS. 1-20, reference numeral 10 generally refers to a control knob having a multi-directional interface portion 12 for use in connection with an appliance 14, typically a laundry appliance 14. The multi-directional control knob 10 includes a rotational component 16 and an axial component 18 that can be operated separately or contemporaneously for making various selections with respect to the appliance 14. According to various aspects of the device, the control knob 10 for the appliance 14 includes a base 20 having an axially-operated switch 22. An outer control assembly 24 is rotationally and axially operable with respect to the base 20. An inner display assembly 26 is rotationally fixed with respect to the base 20 and axially fixed with respect to the outer control assembly 24. The inner display assembly 26 is biased toward an extended state 28 and is axially operable to a selection state 30 that engages the axially-operated switch 22. Through this configuration, the outer control assembly 24 can operate rotationally and axially with respect to the base 20. During rotational operation of the outer control assembly 24, the inner display assembly 26 remains rotationally fixed so that the display module 32 of the inner display assembly 26 remains in an upright position 34, with respect to the appliance 14. While the outer control assembly 24 operates rotationally with respect to the inner display assembly 26, the outer control assembly 24 and the inner display assembly 26 axially operate as a single unit for engaging and disengaging the axially-operated switch 22 to define the extended and selection states 28, 30.

Referring now to FIGS. 9-20, a detent assembly 40 is incorporated within the control knob 10 and extends between the base 20 and the outer control assembly 24. The detent assembly 40 includes a plurality of spring-loaded detents 42 and an opposing detent surface 44. The detent surface 44 includes a plurality of axially-elongated channels 46 that engage the plurality of spring-loaded detents 42 in each of the extended and selection states 28, 30. Accordingly, detents 42, typically in the form of cylindrical or spherical bearings are able to rotationally operate with respect to the detent surface 44. These detents 42 are also able to axially operate with respect to the detent surface 44 by moving through the axially-elongated channels 46 that are defined within the detent surface 44. Accordingly, the detent assembly 40 is able to generate a tactile or haptic feedback, in addition to an auditory feedback, in each of the extended and selection states 28, 30. Stated another way, the detent assembly 40 operates to provide the feedback discussed above when the outer control assembly 24 is rotated and when the outer control assembly 24 and the inner display assembly 26 are axially depressed for engaging the axially-operated switch 22 or released to the extended state 28 that disengages the axially-operated switch 22.

Referring again to FIGS. 8-15, the base 20 for the control knob 10 includes a sliding structure 60 that rotationally secures the inner display assembly 26 so that the inner display assembly 26 is capable only of axial operation with respect to the base 20 for activating or otherwise engaging the axially-operated switch 22. An abutment 62 of the sliding structure 60 that is included within the base 20 serves to define the extended state 28. Accordingly, the inner display assembly 26 is slidably operable within the sliding structure 60, and is maintained within the sliding structure 60 through the use of the abutment 62 defined within the sliding structure 60 of the base 20. For activating the axially-operated switch 22, the inner display assembly 26 includes a selection protrusion 64 that selectively engages the axially-operated switch 22 in the selection state 30.

Referring again to FIGS. 11-20, the control knob 10 includes a controller 70 that is in communication with at least the axially-operated switch 22 and the inner display assembly 26. Within the inner display assembly 26, at least one encoder sheet 72 is coupled with the controller 70, where the encoder sheet 72, or the plurality of encoder sheets 72, is used for monitoring the rotational position 74 of the outer control assembly 24 as it rotates about a rotational axis 76 of the control knob 10 and the inner display assembly 26. To assist in monitoring the rotational position 74 of the outer control assembly 24, the outer control assembly 24 includes at least one contact structure 78, typically a plurality of contact structures 78, that are in communication, typically signal communication, with the encoder sheet 72. Through the engagement between the contact structure 78 and the encoder sheet 72, rotational operation of the outer control assembly 24 operates the contact structure 78 with respect to the encoder sheet 72 to monitor the rotational position 74 of the outer control assembly 24.

According to various aspects of the device, the encoder sheet 72 can include various numbers of encoder sheets 72. In the illustrated, non-limiting example, three separate encoder sheets 72 are coupled with the controller 70. To cooperate with the encoder sheets 72, the outer control assembly 24 can include a plurality of contact structures 78, typically the same number of contact structures 78 as encoder sheets 72. As illustrated in the non-limiting example, three contact structures 78 are included. Accordingly, the contact structures 78 and the encoder sheets 72 cooperate in each of the extended and selection states 28, 30 to monitor the rotational position 74 of the outer control assembly 24 with respect to the inner display assembly 26. This rotational position 74 of the outer control assembly 24 can be used for cycling through options related to operation of the appliance 14.

As exemplified in FIGS. 7-20, the inner display assembly 26 includes the selection protrusion 64 that selectively engages the axially-operated switch 22. The inner display assembly 26 also includes a sensor portion 90 that houses the at least one encoder sheet 72. To house the sensor portion 90, the inner display assembly 26 can include a locking member 92 that axially operates with respect to the base 20 and is also rotationally fixed with respect to the base 20. The locking member 92 houses the sensor portion 90 and the one or more encoder sheets 72. The locking member 92 is coupled with the display base 20 and also slidably engages an axial guide 94 that is defined within the base 20 of the control knob 10. Through this configuration, the display base 20 of the inner display assembly 26 rotationally engages and axially retains the outer control assembly 24. The locking member 92 fixedly attaches to the display base 20 of the inner display assembly 26 and also allows for axial operation of the inner display assembly 26 with respect to the base 20.

Referring again to FIGS. 8-20, the axial guide 94 defined within the base 20 includes opposing seats 100 that receive the opposing portions 102 of the detent assembly 40. Each opposing portion 102 of the detent assembly 40 typically includes a separate detent spring 104, separate detent ball 106 and a separate detent cover plate 108 that secures the detent spring 104 and the detent ball 106 to the seat 100 of the axial guide 94. With the opposing portions 102 of the detent assembly 40 secured to the axial guide 94, the locking member 92 of the inner display assembly 26 slidably engages the axial guide 94 to prevent rotation of the inner display assembly 26 with respect to the base 20. Simultaneously, the opposing portions 102 of the detent assembly 40 extend through the locking member 92 to engage the opposing detent surface 44 that is defined within the outer control assembly 24. In this manner, the outer control assembly 24 engages the base 20 via the opposing portions 102 of the detent assembly 40 that extend through the locking member 92 of the inner display assembly 26. At the same time, a securing ring 110 axially secures the outer control assembly 24 with respect to the display base 20 of the inner display assembly 26. This engagement between the outer control assembly 24 and the display base 20 allows for rotational operation of the outer control assembly 24 about the display base 20, the locking member 92, the base 20 and the opposing portions 102 of the detent assembly 40. In this manner, the display base 20 axially positions and secures the outer control assembly 24 to place the contact structure 78 in signal communication with the encoder sheet 72, and maintain a consistent spacing and the signal communication in each of the extended and selection states 28, 30 of the control knob 10.

As exemplified in FIGS. 11-20, to maintain signal communication between the inner display assembly 26 and the controller 70, the control knob 10 includes a flexible contact 120 that extends from the controller 70 to the display module 32 located within the inner display assembly 26. This flexible contact 120 can also be configured to engage the one or more encoder sheets 72 that are positioned within the sensor portion 90 of the locking member 92 for the inner display assembly 26. As the outer control assembly 24 and the inner display assembly 26 are axially manipulated in unison between the extended and selection states 28, 30, the flexible contact 120 deflects to maintain communication between the components of the interface portion 12 of the outer control assembly 24 and the inner display assembly 26 with the controller 70.

As exemplified in FIGS. 1-20, the control knob 10 for the appliance 14 includes the base 20 that includes a switch 22, typically in the form of the axially-operated switch 22. The inner display assembly 26 includes the selection protrusion 64. The inner display assembly 26 is biased away from the switch 22 and toward the extended state 28. The inner display assembly 26 is also selectively and axially operable within the base 20 to the selection state 30, where the selection protrusion 64 engages the switch 22. The outer control assembly 24 is axially coupled to the inner display assembly 26 and is rotationally operable with respect to the inner display assembly 26 and the base 20. The outer control assembly 24 and the inner display assembly 26 include an encoder structure 130, where the encoder structure 130 includes the contact structure 78 that is rotationally operable with respect to the at least one encoder sheet 72. The detent assembly 40 extends between the base 20 and the outer control assembly 24, where the detent assembly 40 includes a plurality of spring-loaded detents 42 and an opposing detent surface 44 that includes a plurality of axially-elongated channels 46. These plurality of axially-elongated channels 46 engage the plurality of spring-loaded detents 42 in each of the extended and selection states 28, 30.

Referring again to FIGS. 7-20, the control knob 10 can include the display module 32 that is positioned within the inner display assembly 26. The display module 32 can be mounted within a module seat 140 that is defined within the display base 20. Additionally, the display module 32 can be maintained within a controlled environment through one or more seal members 142 that extend around the inner display assembly 26 to prevent infiltration of moisture into the inner portions 144 of the inner display assembly 26. The control knob 10 can include a plurality of seal members 142 that extend between the outer control assembly 24 and the inner display assembly 26, as well as between the outer control assembly 24 and the base 20. Because laundry appliances 14 typically provide for the use of moisture, fluid, laundry chemistries, and other fluid-type materials, the inclusion of the various seal members 142 serves to prevent the infiltration of these fluid-type materials that may affect the operation of the control knob 10 and the appliance 14 as a whole. To further protect the display module 32 of the inner display assembly 26, the inner display assembly 26 can include a glass or plastic lens 146 that is attached to the display base 20 and around which the outer control assembly 24 can be rotated. The lens 146 can also be attached and sealed with the outer control assembly 24 to operate over the display module 32.

As exemplified in FIGS. 7-20, the locking member 92 is fixedly attached to the display base 20. The locking member 92 can include a plurality of tabs 150 that matingly engage a plurality of securing slots 152 within the display base 20. This fixed engagement between the locking member 92 and the display base 20 serves to secure the encoder structure 130 between the locking member 92 and the display base 20 and also secures, axially, the position of the outer control assembly 24 and the contact structure 78 with respect to the sensor portion 90 and the encoder sheet 72 of the locking member 92.

As exemplified in FIGS. 7-20, the base 20 includes the sliding structure 60 and the axial guide 94. The sliding structure 60 and the axial guide 94 can be incorporated within a single guide structure 160 that rotationally secures and also guides the axial movement of each of the locking member 92 and the display base 20. Through this configuration, the display base 20 slidably engages the sliding structure 60 of the base 20. The axial guide 94 engages the locking member 92 and rotationally secures the axial locking member 92 with respect to the base 20. Accordingly, while the locking member 92 and the display base 20 are attached via the tabs 150 and securing slots 152, the sliding structure 60 and the axial guide 94 of the base 20 cooperatively maintain the rotational position 74 of the inner display assembly 26 in a rotationally-fixed state with respect to the base 20. In this manner, the engagement between the locking member 92 and the display base 20 does not receive undue moment forces within the connection area 170 defined between the tabs 150 and the securing slots 152. Through this configuration, any moment force that is exerted upon the inner display assembly 26 through rotation of the outer control assembly 24 is transmitted through the inner display assembly 26 and into the base 20 via the guide structure 160. This configuration prevents unnecessary stresses within the inner display assembly 26.

Additionally, the guide structure 160 includes the seats 100 on which the opposing portions 102 of the detent assembly 40 are mounted. Accordingly, stresses that are experienced within the detent assembly 40 during operation of the outer control assembly 24 are also transmitted to the base 20 via the guide structure 160.

As exemplified in FIGS. 7-20, the sliding structure 60 can include mating undulating structures 180 that are defined between the sliding structure 60 of the base 20 and the selection protrusion 64 of the inner display assembly 26.

Referring again to FIGS. 7-20, the controller 70 for the control knob 10 can be defined within a printed circuit board (PCB) plate that is positioned proximate the base 20. A bottom cover 192 can secure the PCB plate 190 to the base 20 and a seal member 142 can be disposed between the base 20 and the bottom cover 192 to prevent infiltration of fluid and other moisture into or onto the PCB plate 190. The flexible contact 120 can extend between the PCB plate 190 and portions of the inner display assembly 26 for providing communication between the various operable components of the control knob 10.

Referring again to FIGS. 11-20, the control knob 10 can include a plurality of bias springs 210 that extend between the base 20 and the inner display assembly 26. These bias springs 210 serve to bias the outer control assembly 24 and the inner display assembly 26 toward the extended state 28. When the outer control assembly 24 and the inner display assembly 26 are axially operated to the selection state 30, the bias springs 210 serve to return the outer control assembly 24 and the inner display assembly 26 back to the extended state 28. As discussed above, in each of the extended and selection states 28, 30, the opposing portions 102 of the detent assembly 40 maintain engagement with the axially-elongated channels 46 of the opposing detent surface 44 that is defined within the outer control assembly 24. When the selection protrusion 64 of the inner display assembly 26 engages the axially-operated switch 22, the axially-operated switch 22 includes a switch branch 212 that assists in communicating the signal to the PCB plate 190 and the controller 70 for the control knob 10.

Referring again to FIGS. 1-20, the control knob 10 includes the base 20 that includes the axially-operated switch 22. The outer control assembly 24 is rotationally and axially operable with respect to the base 20. The inner display assembly 26 is rotationally fixed with respect to the base 20 and is axially fixed with respect to the outer control assembly 24. The inner display assembly 26 is biased toward the extended state 28 and is selectively and axially operable to the selection state 30 that engages the axially-operated switch 22. The detent assembly 40 extends between the base 20 and the outer control assembly 24 and extends through portions of the inner display assembly 26. The detent assembly 40 includes a plurality of spring-loaded detents 42 and an opposing detent surface 44 that includes a plurality of axially-elongated channels 46. These axially-elongated channels 46 engage the plurality of spring-loaded detents 42 in each of the extended and selection states 28, 30. The spring-loaded detents 42, while being fixed to the base 20, are rotationally operable and axially operable with respect to the detent surface 44. The encoder sheet 72 is coupled with the controller 70 and is attached to the inner display assembly 26. The contact structure 78 is disposed on the outer control assembly 24 and is in signal communication with the encoder sheet 72. Rotational operation of the outer control assembly 24 operates the contact structure 78 with respect to the encoder sheet 72 to monitor and determine the rotational position 74 of the outer control assembly 24. As discussed above, the contact structure 78 and the encoder sheet 72 are in signal communication in each of the extended and selection states 28, 30 of the control knob 10.

As exemplified in FIGS. 8 and 11-20, the selection protrusion 64 can include a center selector 220 and an outer perimeter guide 222. This perimeter guide 222 is configured to engage the sliding structure 60 of the base 20 and allow for only axial operation of the inner display assembly 26 with respect to the base 20. This is in addition to the engagement between the locking member 92 and the axial guide 94 of the base 20 that further maintains the rotational position 74 of the inner display assembly 26 with the base 20 as the control knob 10 moves between the extended and selection states 28, 30.

The axially-operated switch 22, the encoder sheet 72, the flexible contact 120, and other communicating portions of the user interface 230 can include electrical contacts that extend to the PCB plate 190. In various aspects of the device, these electrical contacts can extend directly to the PCB plate 190 or can attach to various portions of the flexible contact 120 which acts as a type of electrical relay for providing electrical communication between the various portions of the outer control assembly 24 and the inner display assembly 26 with the PCB plate 190 and the controller 70. The flexible contact 120 extends through a connector path 224 that is defined through the base 20 and portions of the inner display assembly 26.

Figure 2:
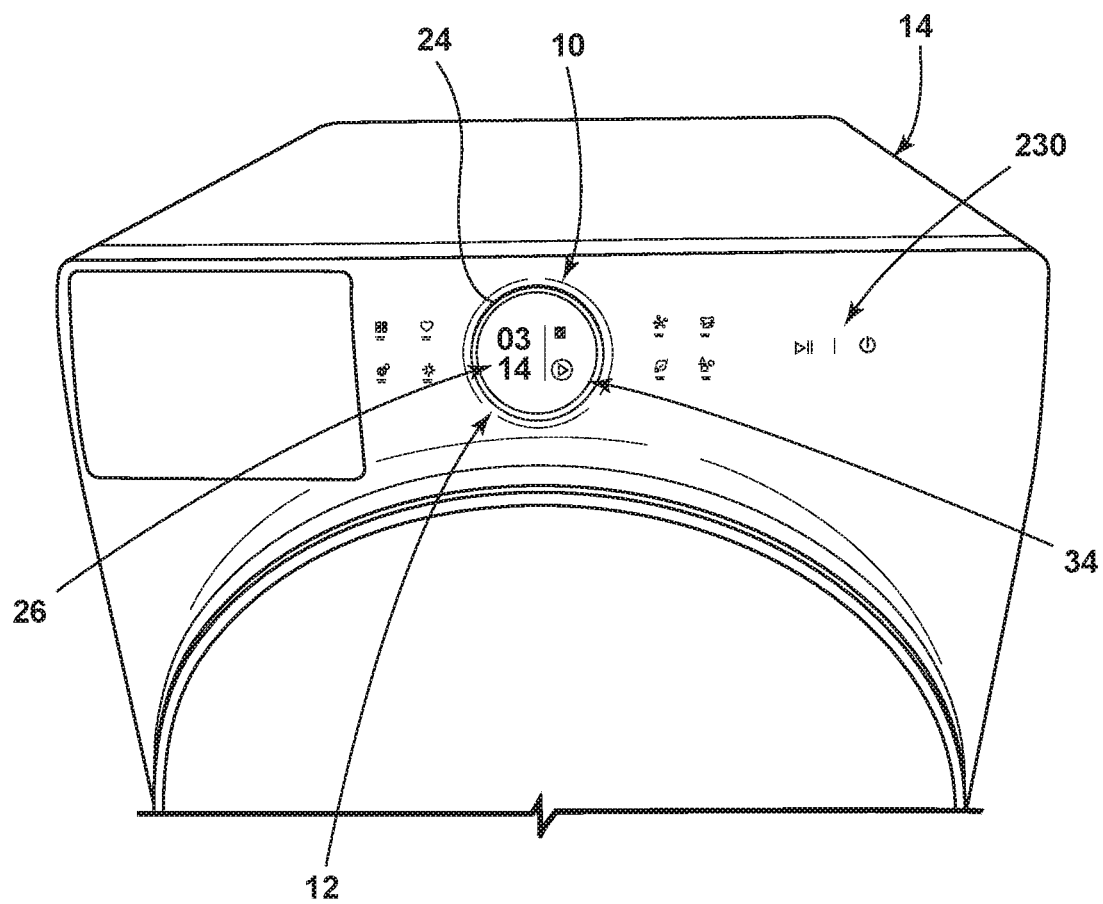
FIG. 2 is a front perspective view of the appliance of FIG. 1 and showing an aspect of the control knob incorporated within a user interface for the appliance.
Figure 3:
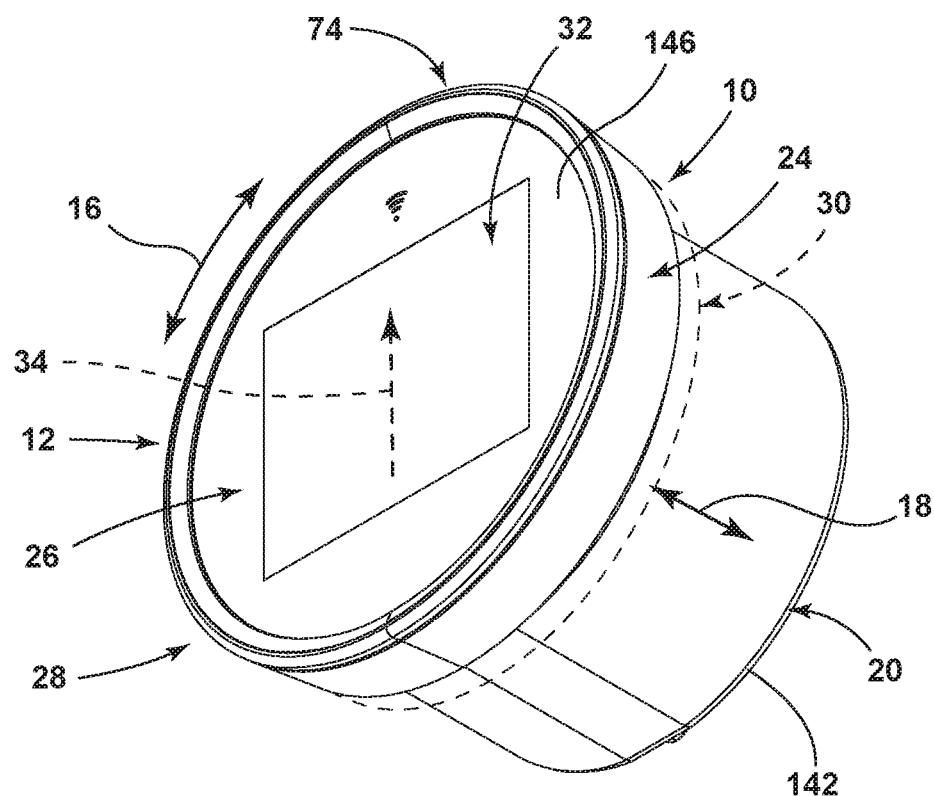
FIG. 3 is a front perspective view of an aspect of the control knob.
Figure 4:
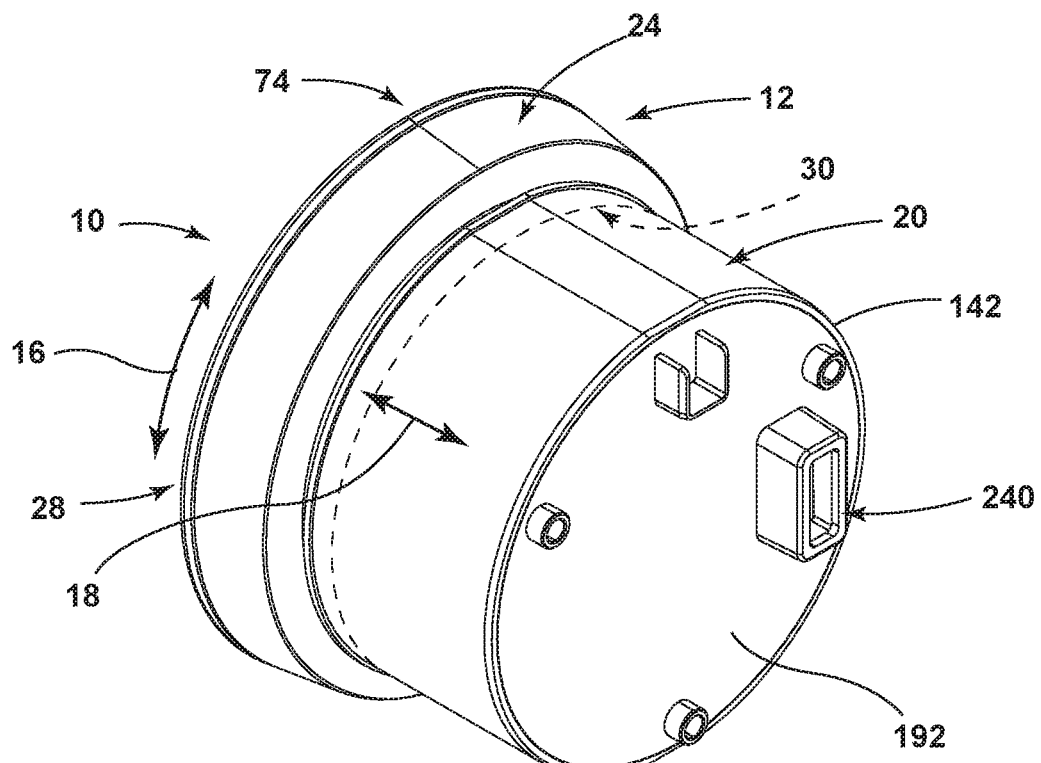
FIG. 4 is a rear perspective view of the control knob of FIG. 3.
Figure 5:
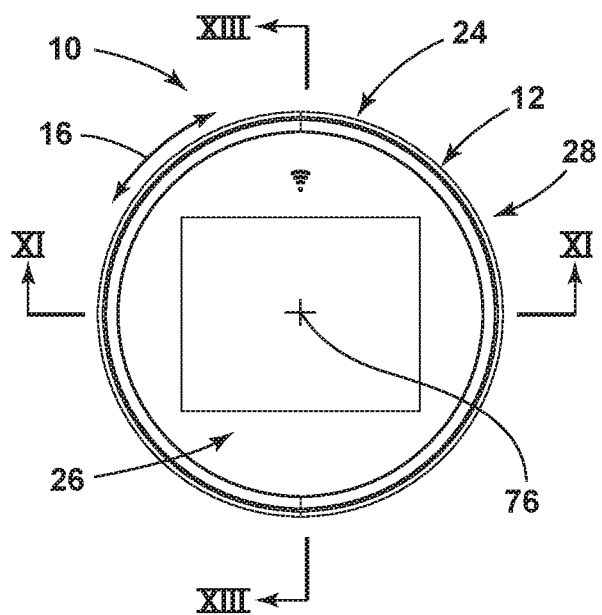
FIG. 5 is a front elevational view of the control knob of FIG. 3.
Figure 6:
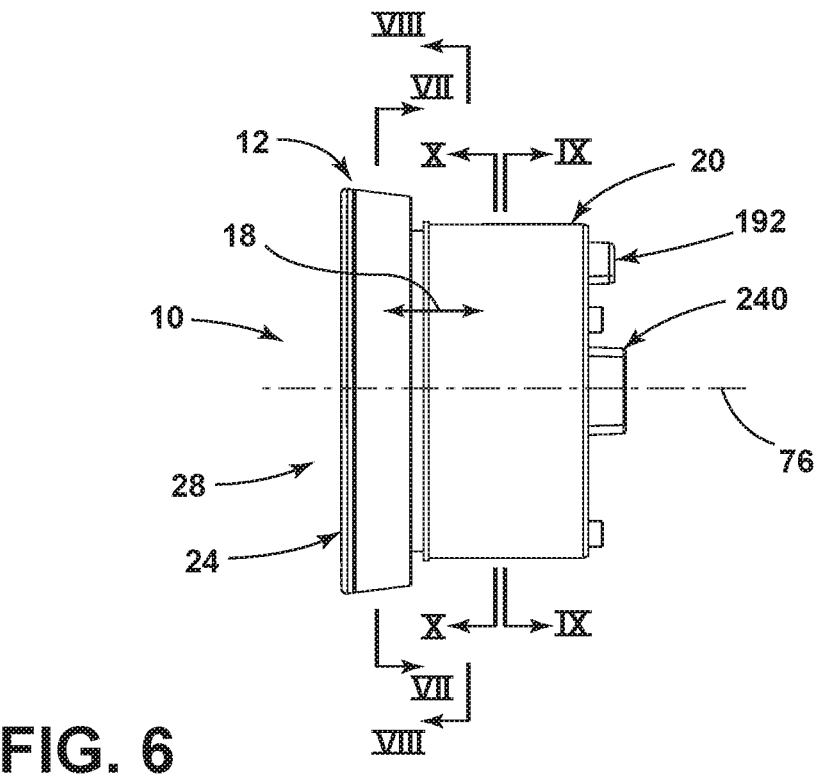
FIG. 6 is a side elevational view of the control knob of FIG. 3.
Figure 7:
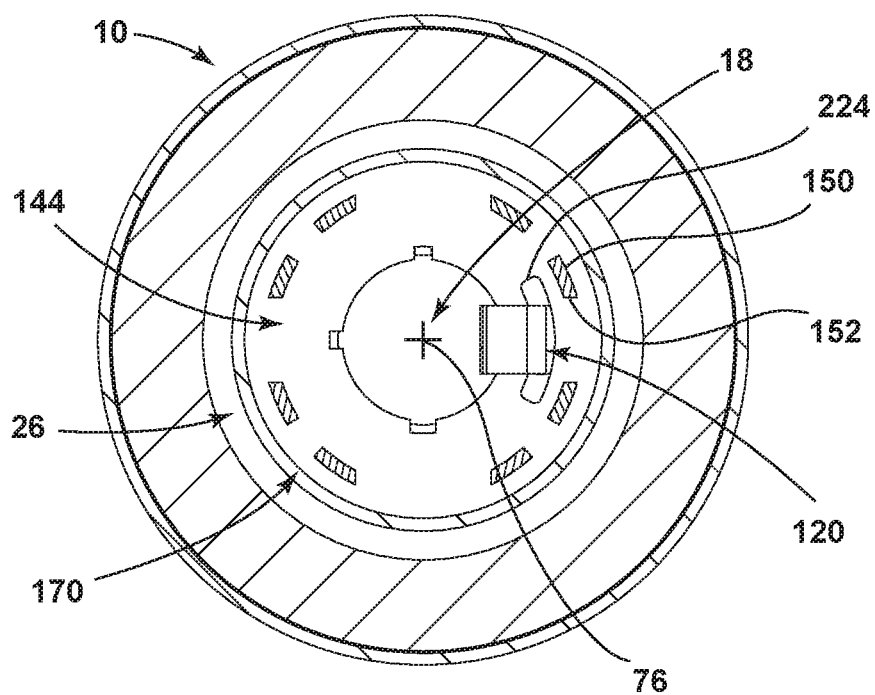
FIG. 7 is a cross-sectional view of the control knob of FIG. 6 taken along line VII-VII.
Figure 8:
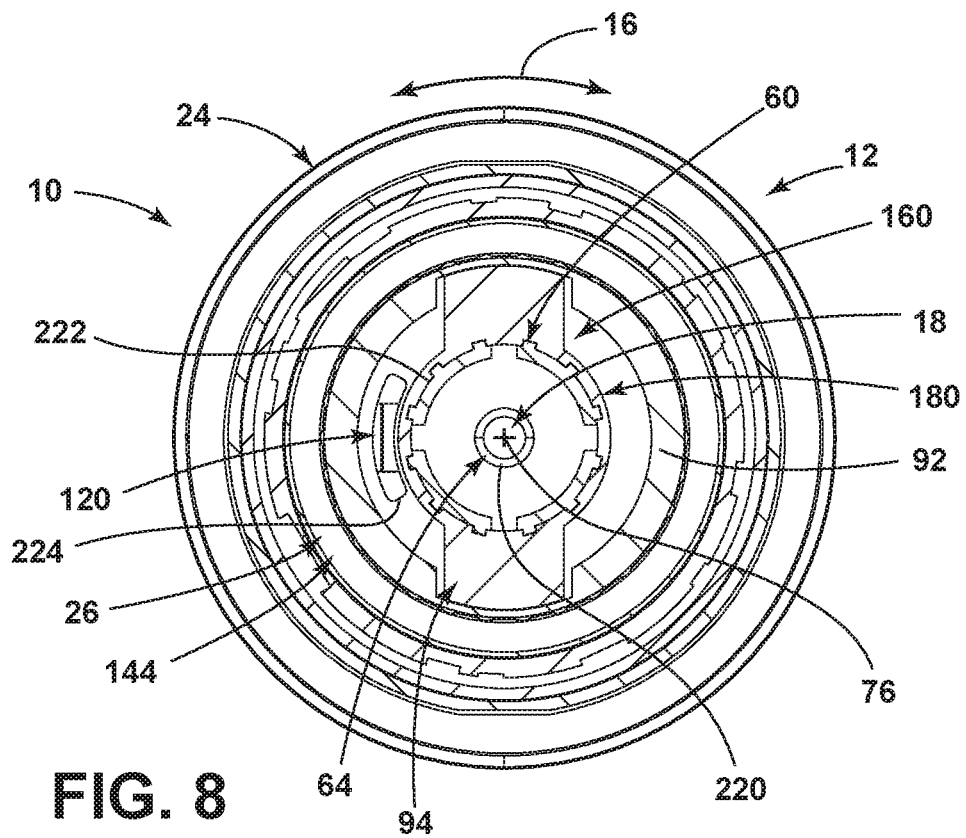
FIG. 8 is a cross-sectional view of the control knob of FIG. 6 taken along line VIII-VIII.
Figure 9:
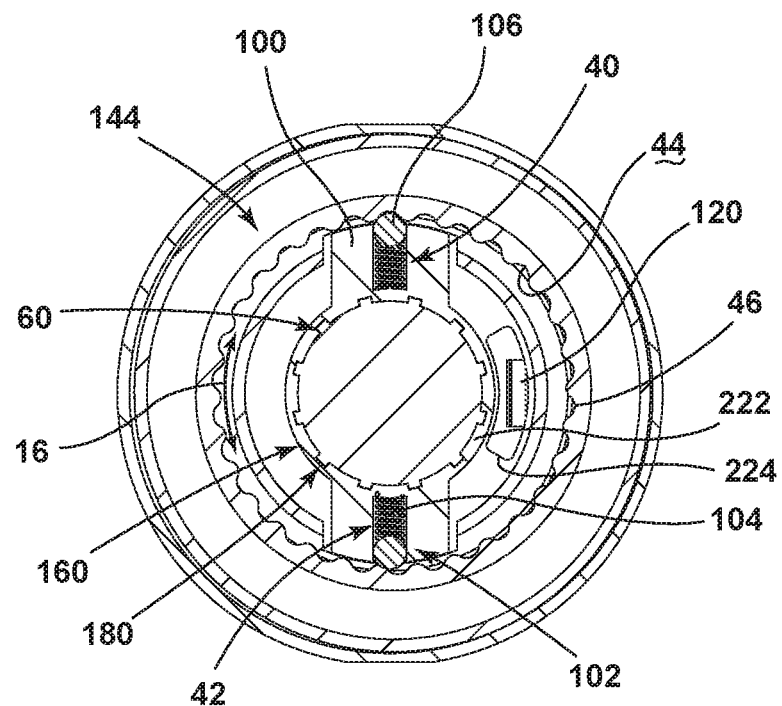
FIG. 9 is a cross-sectional view of the control knob of FIG. 6 taken along line IX-IX.
Figure 10:
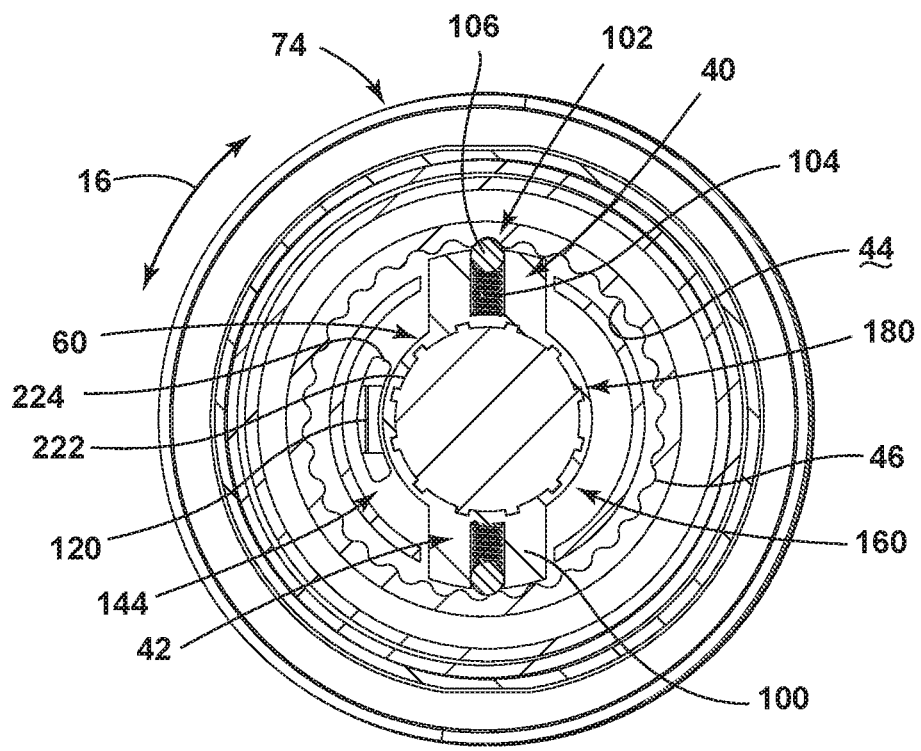
FIG. 10 is a cross-sectional view of the control knob of FIG. 6 taken along line X-X.
Figure 11:
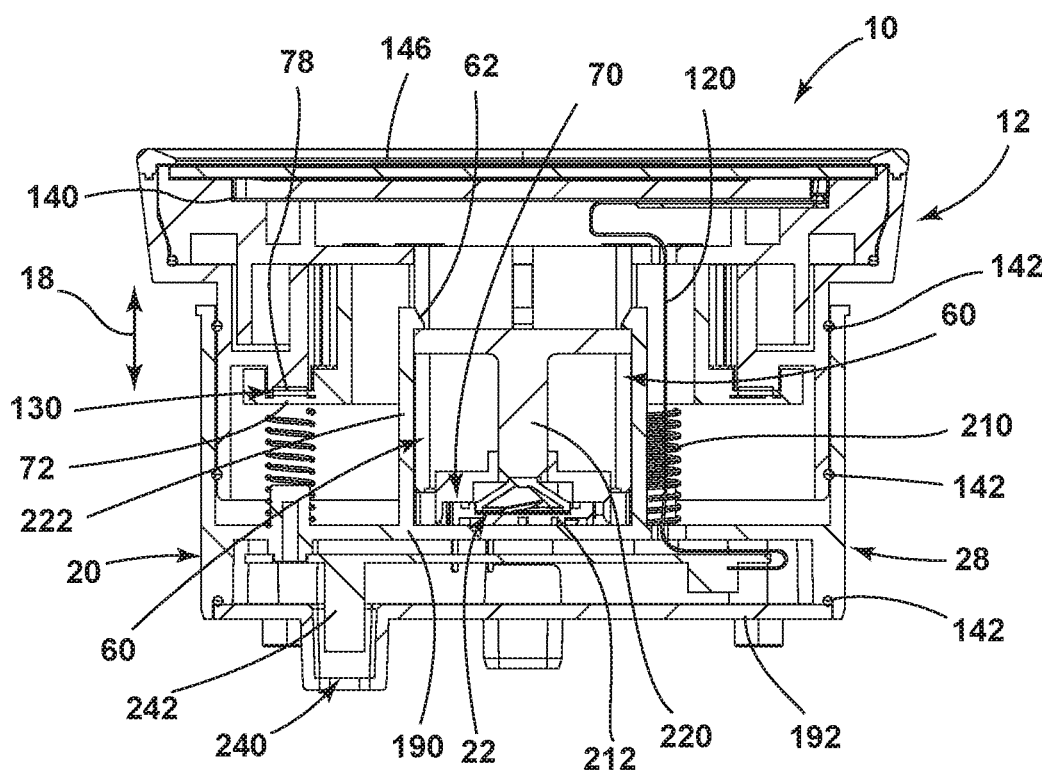
FIG. 11 is a cross-sectional view of the control knob of FIG. 5 taken along line XI-XI and shown in an extended state.
Figure 12:
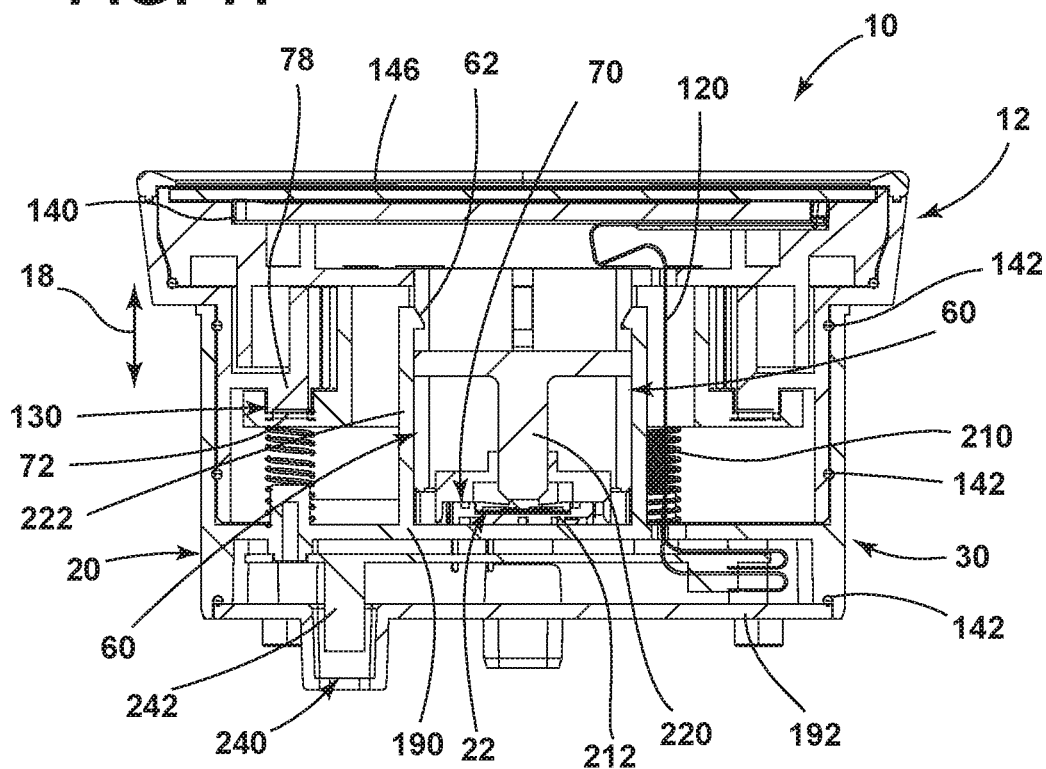
FIG. 12 is a cross-sectional view of the control knob of FIG. 11 and showing the control knob in a compressed selection state.
Figure 13:
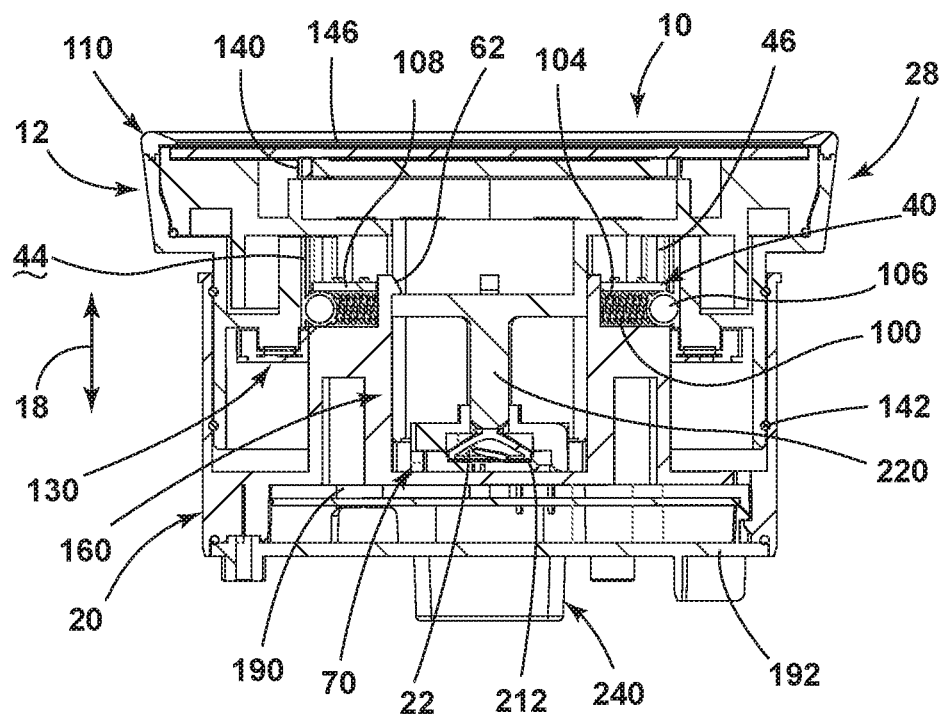
FIG. 13 is a cross-sectional view of the control knob of FIG. 5 taken along line XIII-XIII and showing the control knob in an extended state.
Figure 14:
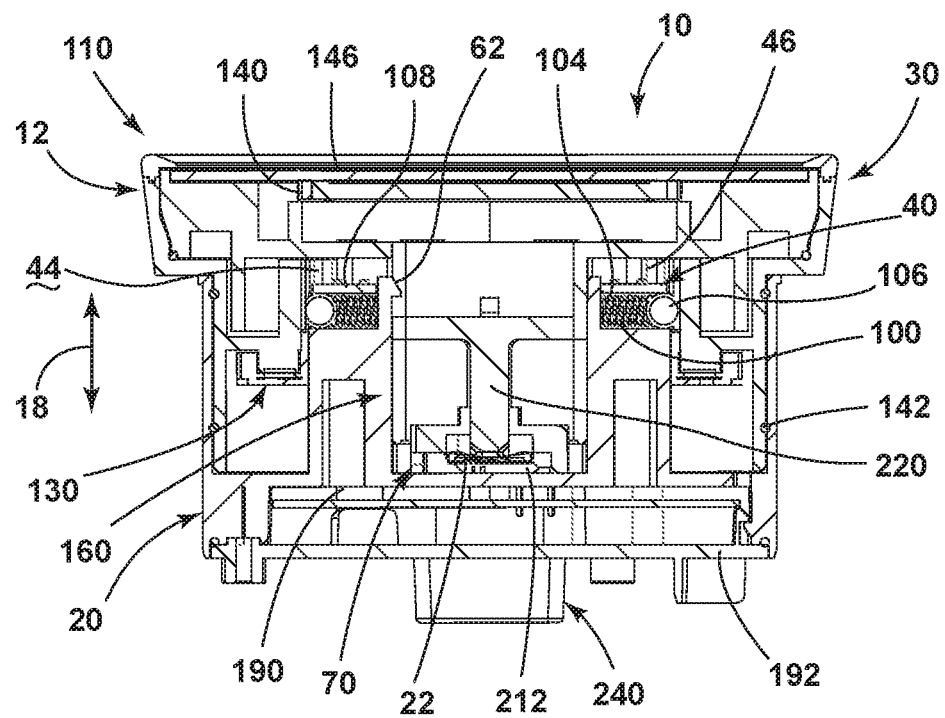
FIG. 14 is a cross-sectional view of the control knob of FIG. 13 and showing the control knob in a compressed selection state.
Figure 15:
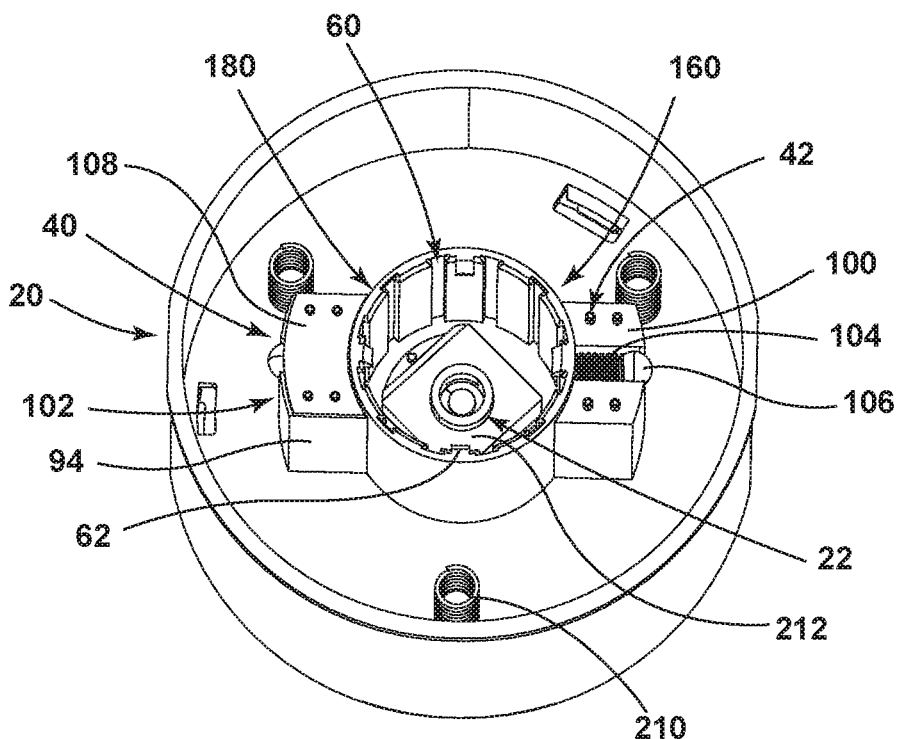
FIG. 15 is a side perspective view of a base and guide structure of the control knob of FIG. 3.
Figure 16:
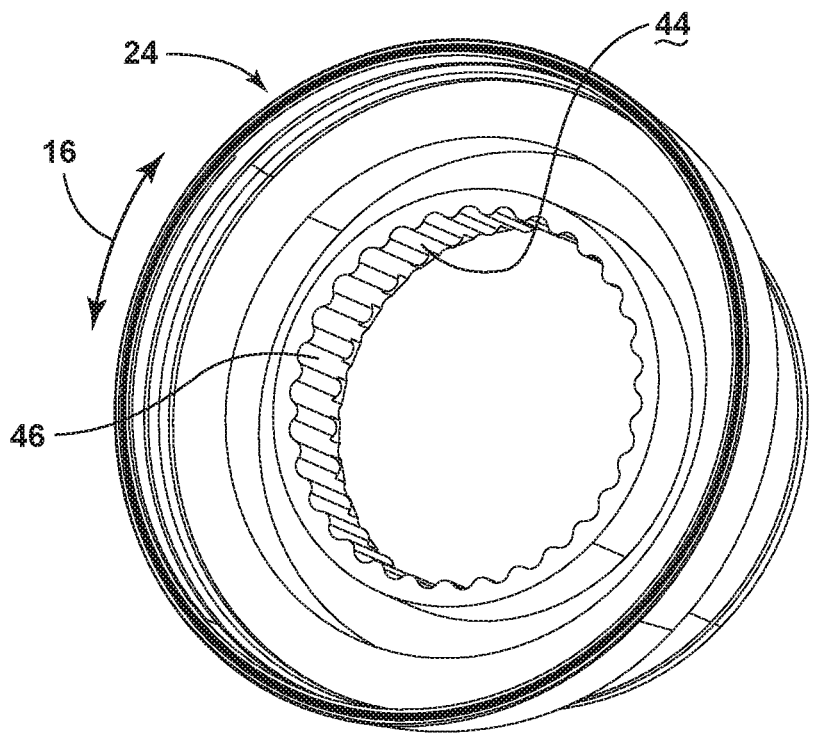
FIG. 16 is a side perspective view of the outer control assembly of the control knob of FIG. 3.
Figure 17:
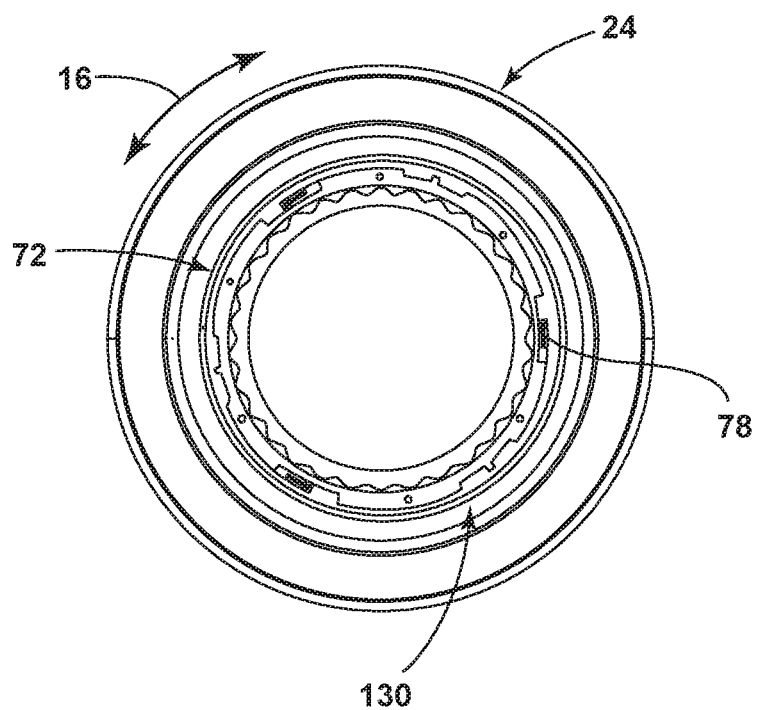
FIG. 17 is an elevational view of the contact structure for the encoder structure of the control knob of FIG. 3.
Figure 18:
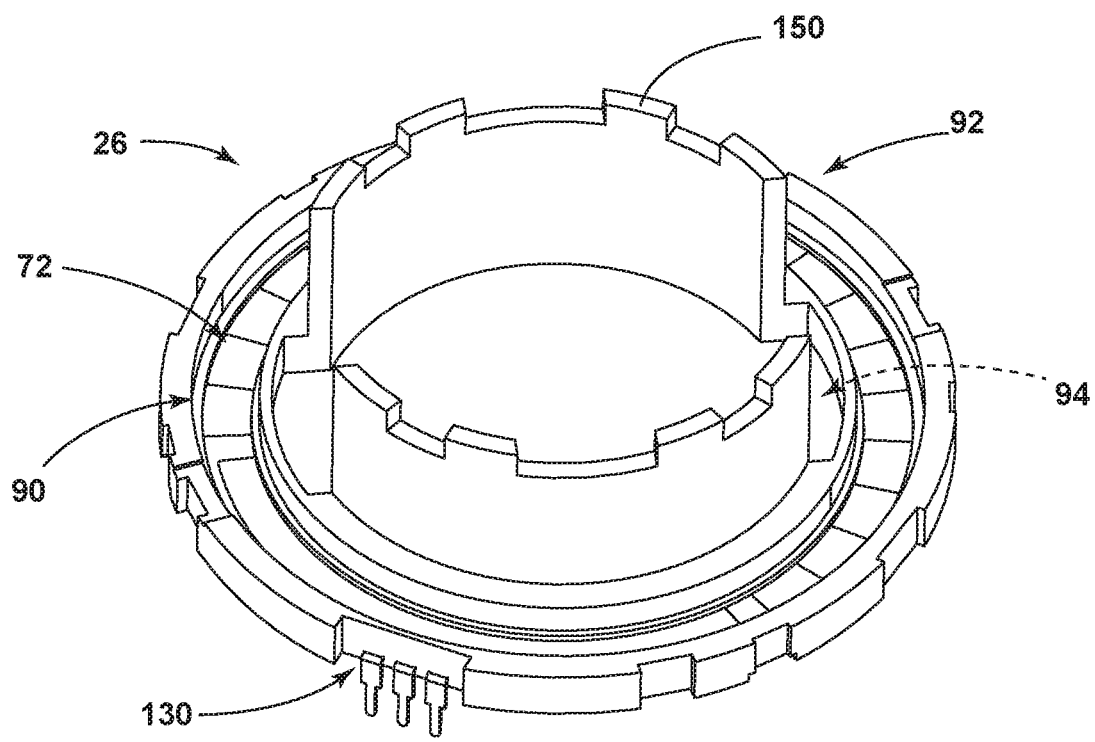
FIG. 18 is a side perspective view of the locking member and the encoder sheets for the encoder structure of the control knob of FIG. 3.
Figure 19:
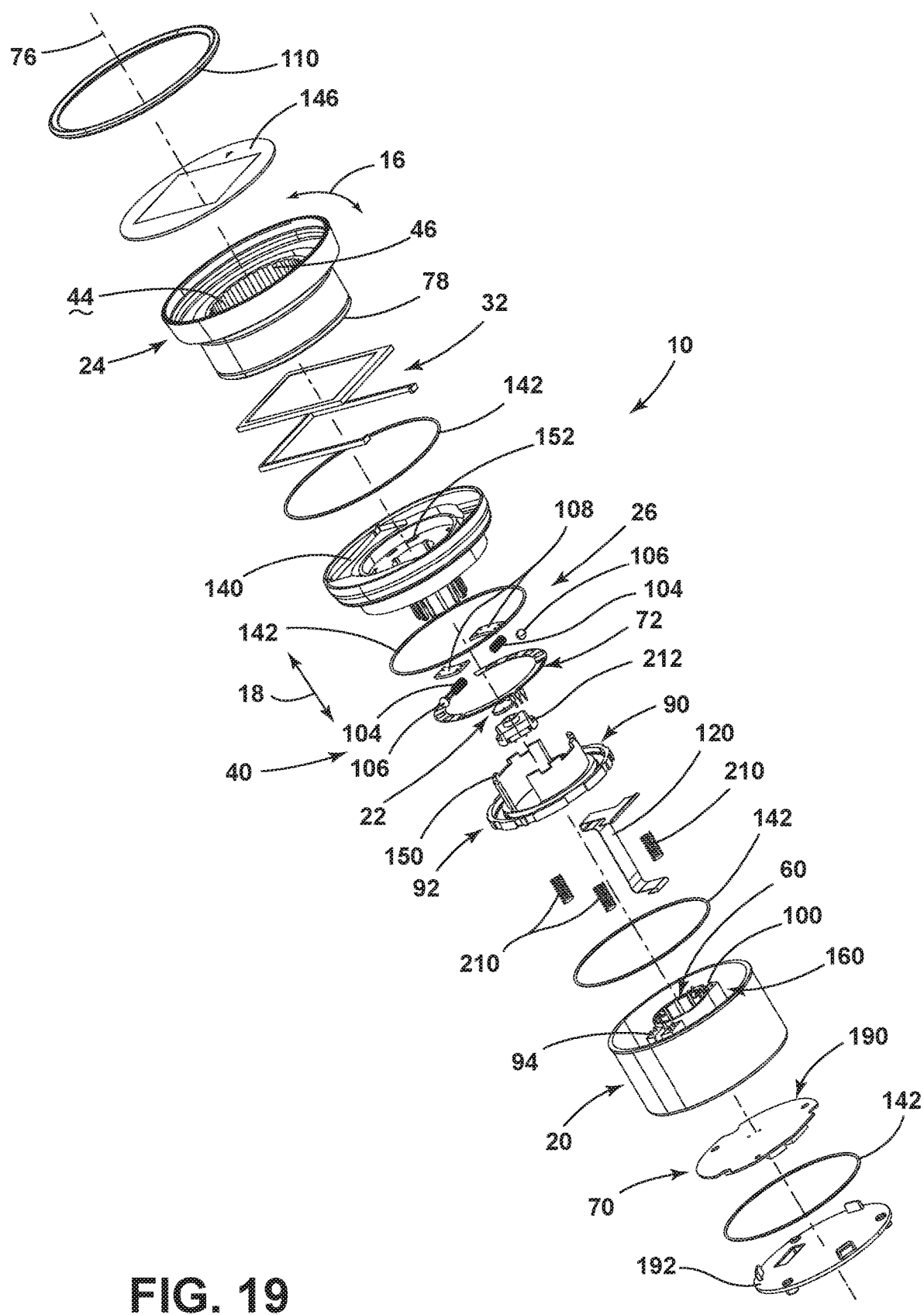
FIG. 19 is an exploded perspective view of the control knob of FIG. 3.
Figure 20:
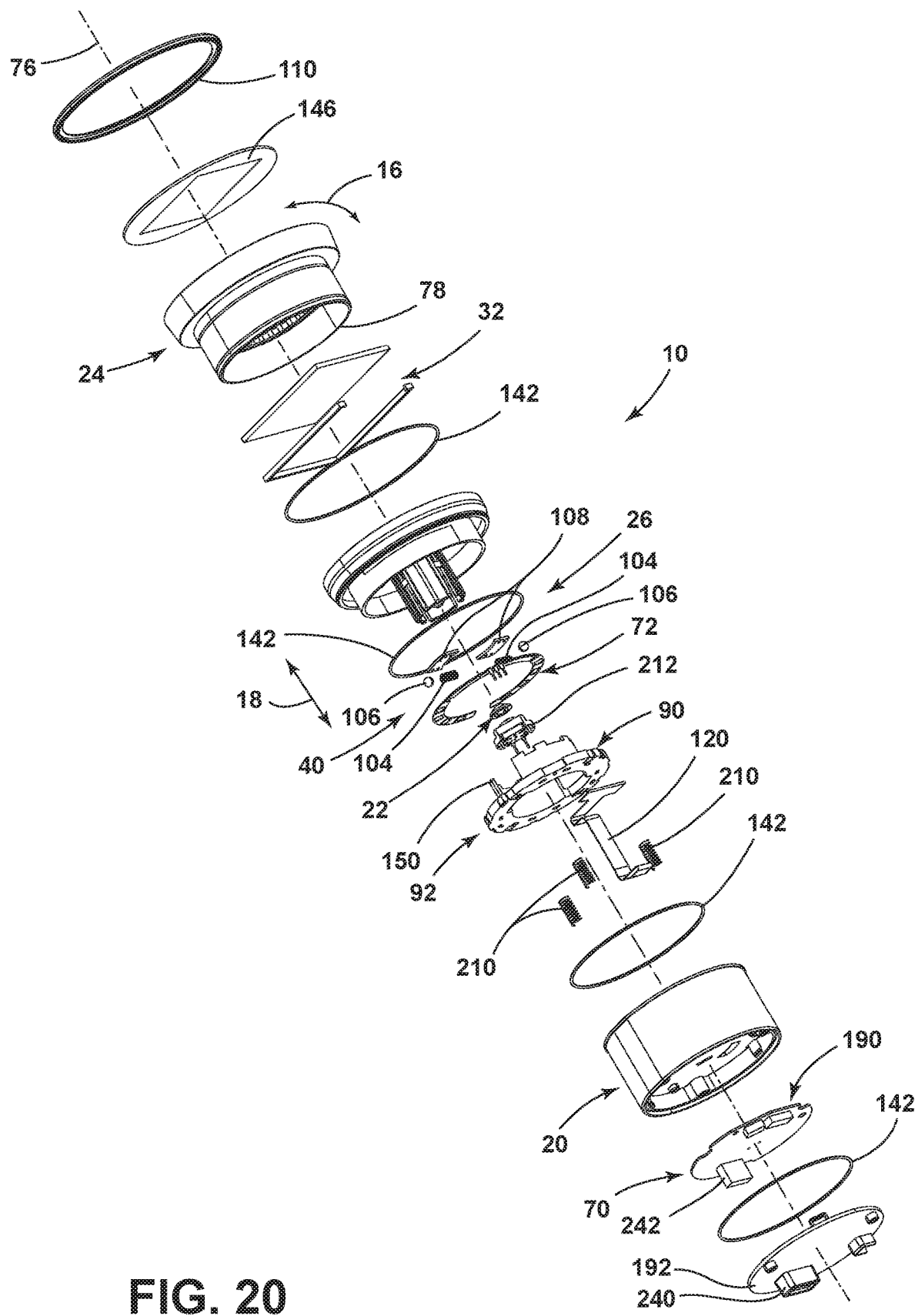
FIG. 20 is another exploded perspective view of the control knob of FIG. 15.

According to various aspects of the device, the controller 70 that is positioned within the control knob 10 can be in communication with the various portions of the user interface 230 for the appliance 14, as exemplified in FIGS. 1 and 2. During operation of the control knob 10, various selections can be made with respect to each portion of the user interface 230 for selecting a performance mode to be performed by the appliance 14. The rotational operation of the outer control assembly 24 can be used to cycle through various options. Axial operation of the outer control assembly 24 and the inner display assembly 26 can be used for making selections related to a particular menu item or for activating a particular sequence to be performed by the appliance 14. The various rotational and axial components 16, 18 of the control knob 10 can be used separately or in combination for making various selections with respect to the appliance 14.

Referring now to FIGS. 3-20, the control knob 10 can include one or more external interfaces 240 that can be used for plugging into the appliance 14. In such an embodiment, the PCB plate 190 can include a plug member 242 that extends through the bottom cover 192, where the plug member 242 is configured for engagement with various electrical and data systems for the appliance 14. In this manner, the control knob 10 can be designed as a plug-and-play device that can be attached to the appliance 14 for operation therewith.

The control knob 10 is described herein as being used in connection with a laundry appliance 14. It should be understood that the control knob 10 can be used within other appliances 14. Such appliances 14 can include, but are not limited to, refrigerators, dishwashers, small appliances, ovens, cooking devices, food processing devices and other similar appliances 14.

According to another aspect of the present disclosure, a control knob for an appliance includes a base having an axially-operated switch. An outer control assembly is rotationally and axially operable with respect to the base. An inner display assembly is rotationally fixed with respect to the base and axially fixed with respect to the outer control assembly. The inner display assembly is biased toward an extended state and is axially operable to a selection state that engages the axially operated switch.

According to another aspect, a detent assembly extends between the base and the outer control assembly, wherein the detent assembly includes a plurality of spring-loaded detents and an opposing detent surface.

According to yet another aspect, the detent surface includes a plurality of axially elongated channels that engage the plurality of spring-loaded detents in each of the extended and selection states.

According to another aspect of the present disclosure, the detents are rotationally operable and axially operable with respect to the detent surface.

According to another aspect, the base includes a sliding structure that rotationally secures the inner display assembly and an abutment of the sliding structure that defines the extended state.

According to yet another aspect, the control knob further comprises a controller that is in communication with at least the axially-operated switch and the inner display assembly.

According to another aspect of the present disclosure, the inner display assembly includes at least one encoder sheet that is coupled with the controller.

According to another aspect, the outer control assembly includes at least one contact structure that is in communication with the at least one encoder sheet, wherein rotational operation of the outer control assembly operates the at least one contact structure with respect to the at least one encoder sheet.

According to yet another aspect, the at least one encoder sheet includes three separate encoder sheets that are coupled with the controller.

According to another aspect of the present disclosure, the at least one contact structure includes three contact structures.

According to another aspect, the inner display assembly includes a selection protrusion that selectively engages the axially-operated switch and a sensor portion that houses the at least one encoder sheet.

According to yet another aspect, the inner display assembly includes an axial locking member that houses the at least one encoder sheet, the axial locking member slidably engaging an axial guide.

According to another aspect of the present disclosure, the inner display assembly includes a display base that rotationally engages and axially retains the outer control assembly, wherein the axial locking member is fixedly attached to the display base of the inner display assembly.

According to another aspect, the display base axially positions the outer control assembly to place the at least one contact structure in signal communication with the at least one encoder sheet.

According to yet another aspect, the control knob further comprises a flexible contact that extends from the controller to a display module located within the inner display assembly.

According to another aspect, a control knob for an appliance includes a base having a switch. An inner display assembly includes a selection protrusion. The inner display assembly is biased away from the switch and toward an extended state and wherein the inner display assembly is selectively and axially operable within the base to a selection state where the selection protrusion engage the switch. An outer control assembly is axially coupled to the inner display assembly and is rotationally operable with respect to the inner display assembly. The outer control assembly and the inner display assembly include an encoder structure. The encoder structure includes at least one contact structure that is rotationally operable with respect to at least one encoder sheet.

According to yet another aspect, the control knob further includes a detent assembly that extends between the base and the outer control assembly, wherein the detent assembly includes a plurality of spring-loaded detents and an opposing detent surface that includes a plurality of axially-elongated channels that engage the plurality of spring-loaded detents in each of the extended and selection states.

According to another aspect of the present disclosure, the control knob further includes a controller that is in communication with at least the axially-operated switch and the inner display assembly.

According to another aspect, a control knob for an appliance includes a base having an axially-operated switch. An outer control assembly is rotationally and axially operable with respect to the base. An inner display assembly is rotationally fixed with respect to the base and axially fixed with respect to the outer control assembly. The inner display assembly is biased toward an extended state and is axially operable to a selection state that engages the axially operated switch. A detent assembly extends between the base and the outer control assembly. The detent assembly includes a plurality of spring-loaded detents and an opposing detent surface that includes a plurality of axially-elongated channels that engage the plurality of spring-loaded detents in each of the extended and selection states wherein the spring-loaded detents are rotationally operable and axially operable with respect to the detent surface.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A control knob for an appliance, the control knob comprising:
   a base having an axially-operated switch;
   an outer control assembly that is rotationally and axially operable with respect to the base; and
   an inner display assembly that is rotationally fixed with respect to the base and axially fixed with respect to the outer control assembly, wherein the inner display assembly is biased toward an extended state and is axially operable to a selection state that engages the axially-operated switch, and the inner display assembly and the axially-operated switch are two different components,
   wherein, while the outer control assembly operates rotationally with respect to the inner display assembly, the outer control assembly and the inner display assembly axially operate for engaging and disengaging the axially-operated switch to define the extended state and the selection state,
   wherein during rotational operation of the outer control assembly, the inner display assembly remains rotationally fixed, such that the inner display assembly is capable only of axial operation with respect to the base.

2. The control knob of claim 1, wherein a detent assembly extends between the base and the outer control assembly, wherein the detent assembly includes a plurality of spring-loaded detents and an opposing detent surface.

3. The control knob of claim 2, wherein the detent surface includes a plurality of axially-elongated channels that engage the plurality of spring-loaded detents in each of the extended and selection states.

4. The control knob of claim 2, wherein the detents are rotationally operable and axially operable with respect to the detent surface.

5. The control knob of claim 1, wherein the base includes a sliding structure that rotationally secures the inner display assembly and an abutment of the sliding structure that defines the extended state.

6. The control knob of claim 1, further comprising a controller that is in communication with at least the axially-operated switch and the inner display assembly.

7. The control knob of claim 6, wherein the inner display assembly includes at least one encoder sheet that is coupled with the controller.

8. The control knob of claim 7, wherein the outer control assembly includes at least one contact structure that is in communication with the at least one encoder sheet, wherein rotational operation of the outer control assembly operates the at least one contact structure with respect to the at least one encoder sheet.

9. The control knob of claim 7, wherein the at least one encoder sheet includes three separate encoder sheets that are coupled with the controller.

10. The control knob of claim 8, wherein the at least one contact structure includes three contact structures.

11. The control knob of claim 7, wherein the inner display assembly includes a selection protrusion that selectively engages the axially-operated switch and a sensor portion that houses the at least one encoder sheet.

12. The control knob of claim 8, wherein the inner display assembly includes an axial locking member that houses the at least one encoder sheet, the axial locking member slidably engaging an axial guide.

13. The control knob of claim 12, wherein the inner display assembly includes a display base that rotationally engages and axially retains the outer control assembly, wherein the axial locking member is fixedly attached to the display base of the inner display assembly.

14. The control knob of claim 13, wherein the display base axially positions the outer control assembly to place the at least one contact structure in signal communication with the at least one encoder sheet.

15. The control knob of claim 6, further comprising a flexible contact that extends from the controller to a display module located within the inner display assembly.

16. A control knob for an appliance, the control knob comprising:
   a base having a switch;
   an inner display assembly having a selection protrusion, wherein the inner display assembly is biased away from the switch and toward an extended state and wherein the inner display assembly is selectively and axially operable within the base to a selection state where the selection protrusion engage the switch, the inner display assembly is rotationally fixed with respect to the base, and the inner display assembly and the switch are two different components; and
   an outer control assembly that is axially coupled to the inner display assembly and is rotationally operable with respect to the inner display assembly, wherein the outer control assembly and the inner display assembly include an encoder structure, wherein the encoder structure includes at least one contact structure that is rotationally operable with respect to at least one encoder sheet,
   wherein, while the outer control assembly operates rotationally with respect to the inner display assembly, the outer control assembly and the inner display assembly axially operate for engaging and disengaging switch to define the extended state and the selection state, wherein during rotational operation of the outer control assembly, the inner display assembly remains rotationally fixed, such that the inner display assembly is capable only of axial operation with respect to the base.

17. The control knob of claim 16, further comprising:

a detent assembly that extends between the base and the outer control assembly, wherein the detent assembly includes a plurality of spring-loaded detents and an opposing detent surface that includes a plurality of axially-elongated channels that engage the plurality of spring-loaded detents in each of the extended and selection states.

18. The control knob of claim 16, further comprising a controller that is in communication with at least the axially-operated switch and the inner display assembly.

19. A control knob for an appliance, the control knob comprising:

a base having an axially-operated switch;

an outer control assembly that is rotationally and axially operable with respect to the base;

an inner display assembly that is rotationally fixed with respect to the base and axially fixed with respect to the outer control assembly, wherein the inner display assembly is biased toward an extended state and is axially operable to a selection state that engages the axially-operated switch, and the inner display assembly and the axially-operated switch are two different components; and a detent assembly that extends between the base and the outer control assembly, wherein the detent assembly includes a plurality of spring-loaded detents and an opposing detent surface that includes a plurality of axially-elongated channels that engage the plurality of spring-loaded detents in each of the extended and selection states, wherein the detent surface and the spring-loaded detents are rotationally operable and axially operable with respect to one another, wherein, while the outer control assembly operates rotationally with respect to the inner display assembly, the outer control assembly and the inner display assembly axially operate for engaging and disengaging the axially-operated switch to define the extended state and the selection state, wherein during rotational operation of the outer control assembly, the inner display assembly remains rotationally fixed, such that the inner display assembly is capable only of axial operation with respect to the base.

20. The control knob of claim 19, further comprising:

an encoder sheet coupled with a controller and attached to the inner display assembly; and a contact structure disposed on the outer control assembly and in signal communication with the encoder sheet, wherein rotational operation of the outer control assembly operates the contact structure with respect to the encoder sheet.

* * * * *